(12) United States Patent
Senshu et al.

(10) Patent No.: US 6,718,120 B1
(45) Date of Patent: Apr. 6, 2004

(54) MAGNETIC RECORDING AND REPRODUCTION METHOD AND APPARATUS

(75) Inventors: Yoichiro Senshu, Kanagawa (JP); Masayoshi Kumagawa, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/546,472

(22) Filed: Apr. 10, 2000

(30) Foreign Application Priority Data

Apr. 12, 1999 (JP) .......................................... 11-104252

(51) Int. Cl.[7] .......................... H04N 5/95; G11B 5/584
(52) U.S. Cl. ............................ 386/88; 386/47; 386/63; 386/93; 386/95; 360/77.14; 360/57
(58) Field of Search ............................ 386/47, 63, 65, 386/78, 79, 81, 88, 93, 95; 360/18, 27, 55, 57, 77.14, 78.14; H04N 5/95; G11B 5/584

(56) References Cited

U.S. PATENT DOCUMENTS

| | | | | |
|---|---|---|---|---|
| 4,361,857 A | * | 11/1982 | Sakamoto | 360/77.17 |
| 4,420,778 A | * | 12/1983 | Sakamoto | 360/77.16 |
| 5,132,807 A | * | 7/1992 | Takimoto et al. | 386/98 |
| 5,926,604 A | * | 7/1999 | Yanagihara et al. | 386/68 |
| 6,028,726 A | * | 2/2000 | Yanagihara | 360/48 |

FOREIGN PATENT DOCUMENTS

| | | |
|---|---|---|
| EP | 0 658 880 A1 | 6/1995 |
| EP | 0 664 646 A2 | 7/1995 |
| EP | 0 860 996 A2 | 8/1998 |

OTHER PUBLICATIONS

Patent abstracts of Japan vol. 010, No. 308, Oct. 21, 1986 & JP 61 120323 A (Sony Corporation), Jun. 7, 1986.

* cited by examiner

*Primary Examiner*—Vincent Boccio
*Assistant Examiner*—James A Fletcher
(74) *Attorney, Agent, or Firm*—Frommer Lawrence & Haug LLP; William S. Frommer

(57) ABSTRACT

In a recording and reproduction method for recording digital data on magnetic tape by a helical scanning method or for reproducing digital data recorded on magnetic tape by the helical scanning method, a plurality of sectors are generated in each track on the magnetic tape and various types of data, such as video data and audio data, and track-synchronization data are recorded. Pilot signals for tracking control are recorded on the various types of data in a superposition manner by the use of three different frequencies such that the frequency changes every track in a predetermined repetition manner. The pilot signal is recorded so as to have a higher level at least in two blocks in a sector where the track-synchronization data is recorded than in the other portion of each track.

8 Claims, 6 Drawing Sheets

MAGNETIC RECORDING AND REPRODUCTION METHOD AND APPARATUS

BACKGROUND OF THE INVENTION

1. Field of the Invention

The present invention relates to magnetic recording and reproduction apparatuses and methods therefor, and more particularly, to a magnetic recording and reproduction apparatus and a method therefor, in which digital data is recorded by a helical scanning method or reproduced.

2. Description of the Related Art

Portable digital video tape recorders including cameras (digital camcorders) and installation-type digital video tape recorders have been available these days, which record digital video signals and digital audio signals into magnetic tape.

As a recording method for the above digital video tape recorders, a so-called DV method (IEC 61834 Helical scan digital video tape cassette recording system using 6.35 mm magnetic tape for consumers—525/60, 625/50, 1125/60, and 1250/50 systems) is used. The assignee of the present invention has filed two related applications (U.S. Pat. No. 5,926,604 and No. 6,028,726).

In the DV method, video tape 6.35 mm (=¼ inches) wide is used, which is narrower than video tape used in related analog video tape recorders by their recording methods, such as a so-called 8-mm method (IEC 60843 Helical scan video tape cassette recording system using 8 mm magnetic tape for consumers).

In the DV method, although the tape width is smaller than that conventionally used, since a signal to be recorded is compressed and a recording density is increased, the DV method allows higher-quality recording for a longer period than recording methods for related analog video tape recorders.

A track structure in the DV method is as follows: from the top of a track, an insert-and-track-information (ITI) sector serving as a time-axis reference during so-called after recording, an interference area (ITG: Inter track gap) (GAP1), an audio (Audio) sector, another interference area (GAP2), a video (Video) sector, yet another interference area (GAP3), and a sub-code (Sub-code) sector are sequentially disposed.

In the DV method, the ITI (ITI) sector is provided for a track in order to use data recorded in the ITI (ITI) sector as a positional reference in the rotating direction (time-axis direction) of the rotating drum so that time-axis information required for after recording of audio and video into a track on the tape can be obtained from the timing when the data recorded in the ITI sector is read.

Data recorded in the ITI (ITI) sector is not rewritten even if a part of data recorded in a track is rewritten, for example, in after recording of video and audio. The data in the ITI (ITI) sector is used for tracking servo during after recording. Therefore, the level of a pilot signal for servo is enhanced (the signal level is increased) in the ITI (ITI) sector as compared with in the other portion of a track.

There is a method (hereinafter called a digital 8-mm method) in which digital data of two tracks in the above DV method is continuously recorded in one track on magnetic tape (8 mm wide) wider than that used in the DV method. Also in this digital 8-mm method, the ITI (ITI) sector is used for the same purpose so as to maintain compatibility with the DV method in terms of circuits such as an LSI.

A positional shift at starting points between two adjacent tracks on magnetic tape is generally called a sync lag (Sync-lag). Sync lags in the DV method and the digital 8-mm method are 6.1 $\mu$s and 20.3 $\mu$s, respectively, and the sync lag in the digital 8-mm method is about three times that in the DV method. This is due to a geometrical difference in track pattern between the DV method, which uses a track pitch of 10 $\mu$m and a track recording angle of about 10 degrees, and the digital 8-mm method, which uses a track pitch of 16.34 $\mu$m and a track recording angle of about 5 degrees.

Since data recorded in the ITI (ITI) sector is read when a head is on the track, there is no problem to use the data as a positional reference in the rotation direction of a rotating drum. During after recording, a sync lag causes some effect when a pilot signal is read from an adjacent track for achieving tracking servo.

Figure 6:
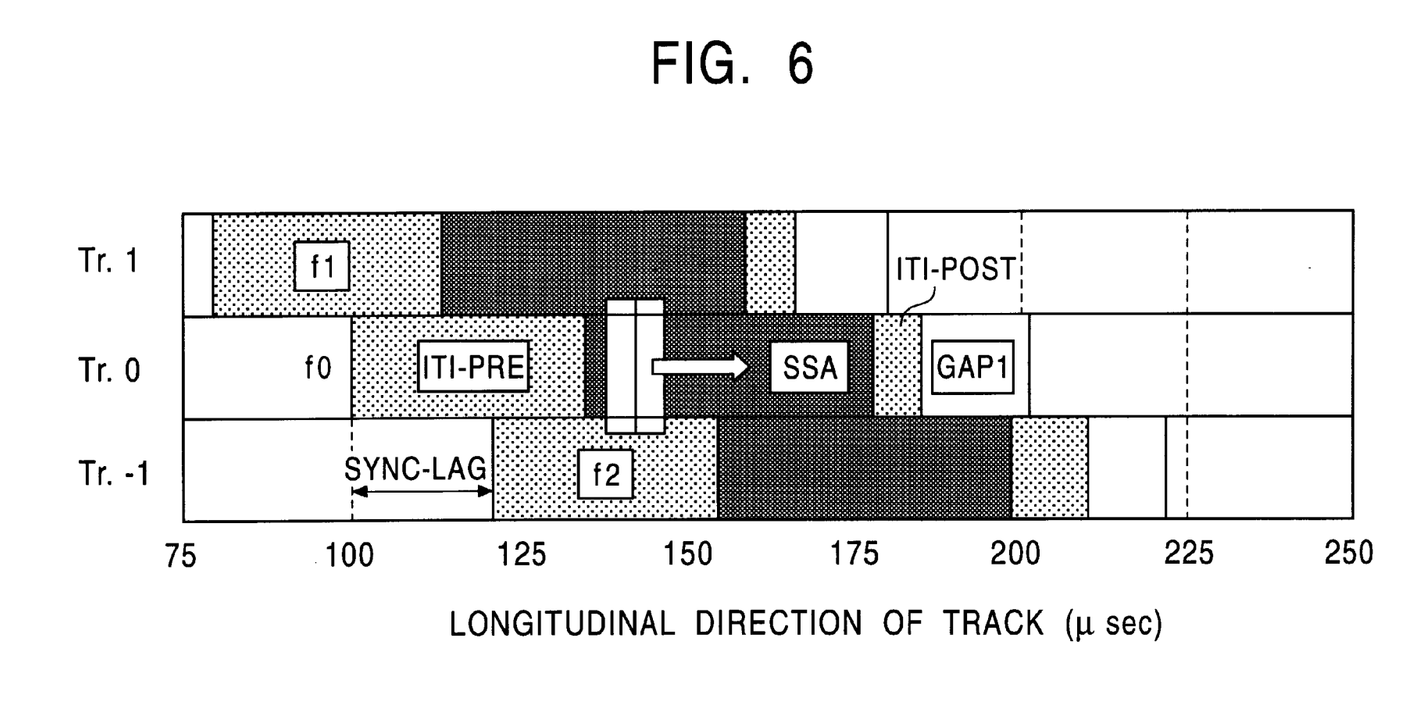
FIG. 6 is a view showing pilot-signal reproduction in an ITI area in a usual digital 8-mm method.
Figure 7:
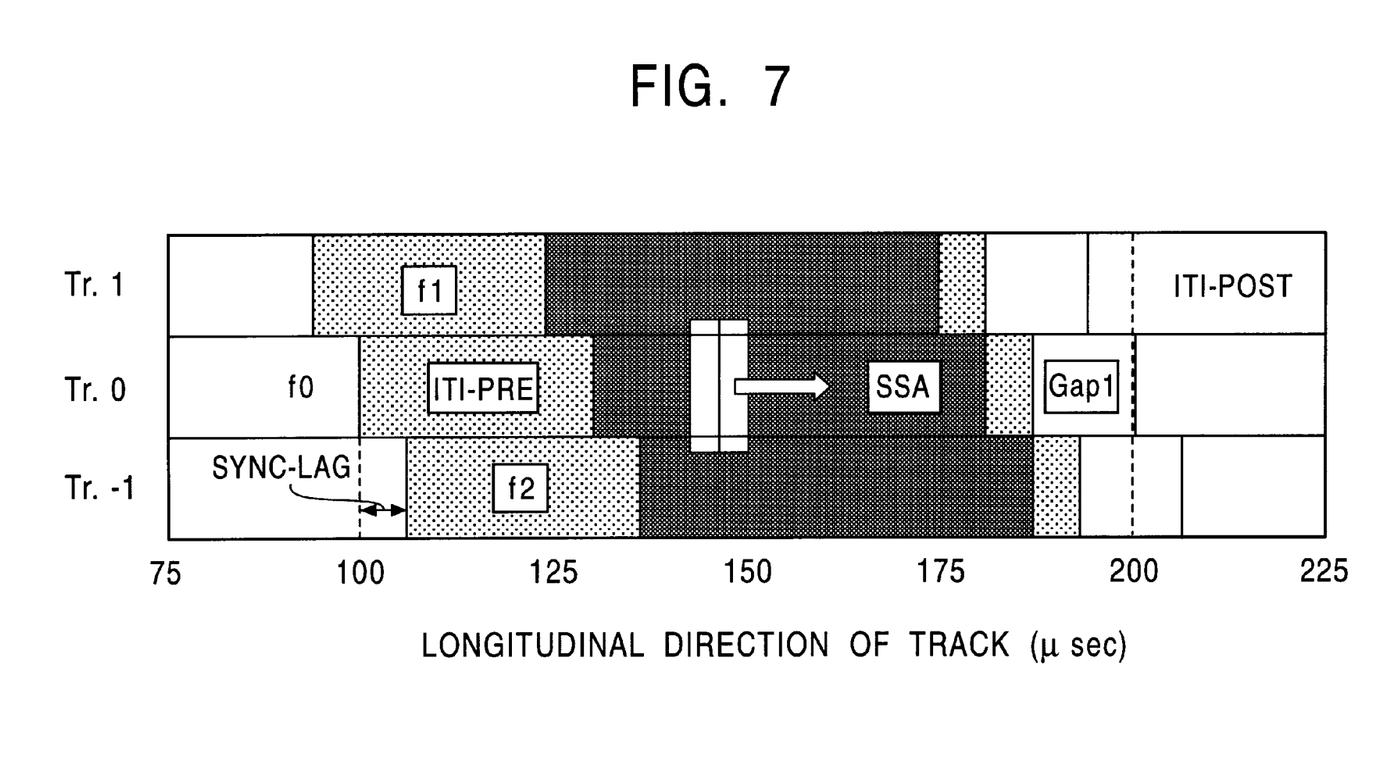
FIG. 7 is a view showing pilot-signal reproduction in an ITI area in a DV method.

As shown in FIG. 6 and FIG. 7, which show track conditions near ITI (ITI) sectors in the digital 8-mm method and the DV method, respectively, it is understood that a period of time when a magnetic head can read pilot signals on upper and lower tracks at the same time is very short (4.59−2×6.1=33.7 $\mu$s for the DV method whereas 45.9−2× 20.3=5.3 $\mu$s for the digital 8-mm method). It is very difficult to obtain correct information for achieving tracking servo within as short as 5.3 $\mu$s in the digital 8-mm method, depending on the time constant of a filter for the pilot signal and an error in sampling time.

SUMMARY OF THE INVENTION

Accordingly, it is an object of the present invention to allow data recorded in the ITI sector, which serves as a time-axis reference during after recording, to be correctly read to obtain correct information for achieving tracking servo.

The foregoing object is achieved in one aspect of the present invention through the provision of a recording and reproduction method for recording digital data on magnetic tape by a helical scanning method or for reproducing digital data recorded on magnetic tape by the helical scanning method, including the steps of generating a plurality of sectors in each track on the magnetic tape and recording various types of data, such as video data and audio data, and track-synchronization data; recording pilot signals for tracking control on the various types of data in a superposition manner by the use of three different frequencies such that the frequency changes every track in a predetermined repetition manner; and recording the pilot signal so as to have a higher level at least in two blocks in a sector where the track-synchronization data is recorded than in the other portion of each track.

Since the level of the pilot signal has been increased at many portions, pilot signals recorded in adjacent tracks can be detected at the same time within an extended period of time during after recording. Data recorded in the ITI sector, which serves as a time-axis reference, is therefore correctly read and tracking servo is successfully applied.

The foregoing object is achieved in another aspect of the present invention through the provision of a recording and reproduction apparatus for recording digital data by a magnetic head on magnetic tape by a helical scanning method or for reproducing by a magnetic head digital data recorded on magnetic tape by the helical scanning method, including a circuit for generating a plurality of sectors in each track on the magnetic tape and for recording various types of data, such as video data and audio data, and track-synchronization data; a circuit for recording pilot signals for tracking control on the various types of data in a superposition manner by the use of three different frequencies such that the frequency changes every track in a predetermined repetition manner; and a circuit for recording the pilot signal so as to have a higher level at least in two blocks in a sector where the track-synchronization data is recorded than in the other portion of each track.

Since the level of the pilot signal has been increased at many portions, pilot signals recorded in adjacent tracks can be detected at the same time within an extended period of time during after recording. Data recorded in the ITI sector, which serves as a time-axis reference, is therefore correctly read and tracking servo is successfully applied.

The level of a pilot signal in all blocks in the track-synchronization-information sector may be made higher than that in the other portion of each track. In this case, since the levels of pilot signals have been increased at more portions, pilot signals recorded in adjacent tracks can be detected at the same time in a further extended period of time during after recording. Data recorded into the ITI sector, which serves as a time-axis reference, is correctly read, and therefore, it becomes extremely easy to apply tracking servo.

Data may be recorded in each track by the additional use of a flying erase head. In this case, previous data does not remain. An adverse effect of remaining data does not occur.

BRIEF DESCRIPTION OF THE DRAWINGS

FIGS. 1 to 5 show a magnetic recording and reproduction apparatus and a method therefor according to an embodiment of the present invention.

DESCRIPTION OF THE PREFERRED EMBODIMENT

A magnetic recording and reproduction apparatus and a method therefor according to an embodiment of the present invention will be described below by referring to the attached drawings.

In a recording and reproduction method for recording digital data on magnetic tape 1 by a helical scanning method or for reproducing digital data recorded on magnetic tape 1 by the helical scanning method, according to the present invention, a plurality of sectors are generated in each track on the magnetic tape and various types of data, such as video data and audio data, and track-synchronization data are recorded; pilot signals for tracking control are recorded on the various types of data in a superposition manner by the use of three different frequencies such that the frequency changes every track in a predetermined repetition manner; and the pilot signal is recorded so as to have a higher level at least in two blocks in a sector where the track-synchronization data is recorded than in the other portion of each track.

In a recording and reproduction apparatus for recording digital data by magnetic heads 3 on magnetic tape 1 by a helical scanning method or for reproducing by the magnetic heads 3 digital data recorded on the magnetic tape 1 by the helical scanning method, according to the present invention, a plurality of sectors are generated in each track on the magnetic tape and various types of data, such as video data and audio data, and track-synchronization data are recorded; pilot signals for tracking control are recorded on the various types of data in a superposition manner by the use of three different frequencies such that the frequency changes every track in a predetermined repetition manner; and the pilot signal is recorded so as to have a higher level at least in two blocks in a sector where the track-synchronization data is recorded than in the other portion of each track.

The following embodiment describes a case in which the present invention is applied to a method (digital 8-mm method) in which digital data of two tracks in the so-called DV method is continuously recorded in one track on magnetic tape (8 mm wide) wider than that used in the DV method. Since the digital 8-mm method is described in detail in a previous patent application (Unexamined Japanese Patent Application Publication No. Hei-10-272135) of the assignee of the present invention, which is now being filed to the USPTO, only portions related to the present invention will be described below.

Figure 3:
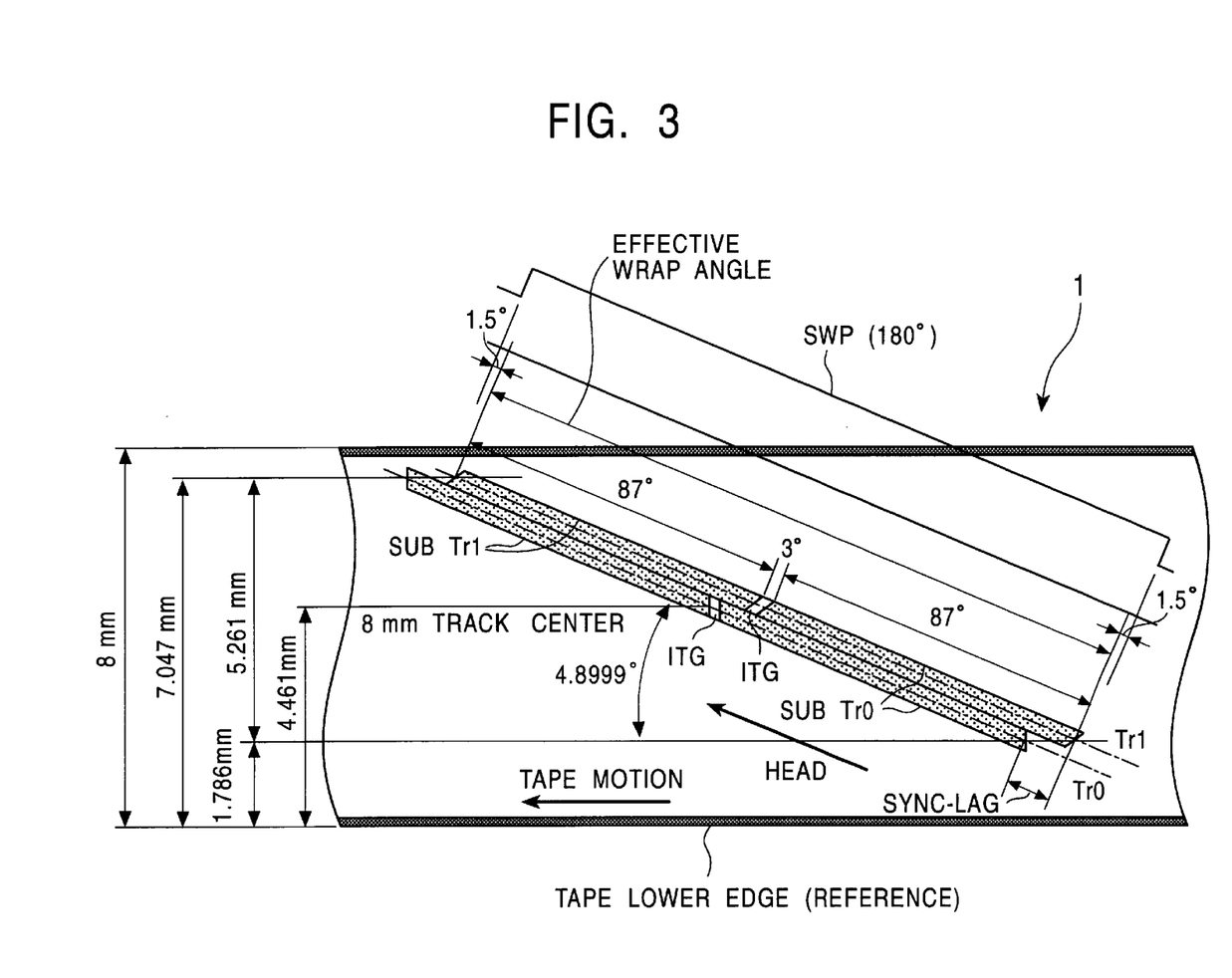
FIG. 3 is a view of a track pattern on the magnetic tape.

In the digital 8-mm method, a digital video signal and a digital audio signal are recorded by a rotating drum 2 on the magnetic tape 1 having a width of 8 mm, which is wider than magnetic tape (about 6.35 mm wide) used by the DV method, as indicated in a track pattern shown in FIG. 3. The magnetic tape 1 is identical to that used in a so-called 8-mm method (IEC 60843), which is a related analog-type method for recording video and audio signals.

Figure 2:
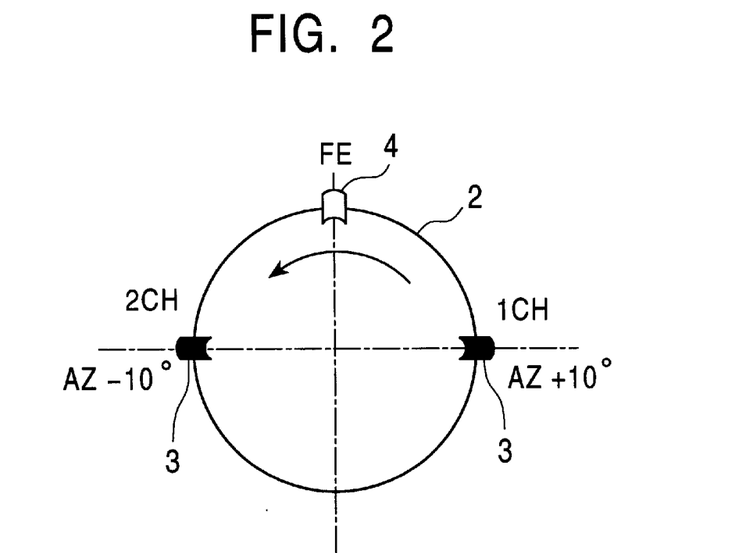
FIG. 2 is a view of the arrangement of magnetic heads on the rotating drum.

The rotating drum 2 is provided, for example, with two magnetic heads 3 having different azimuth angles, disposed at positions 180 degrees apart as in the related analog-type 8-mm method, as shown in FIG. 2. These two magnetic heads 3 scan the magnetic tape 1 at a predetermined angle against the running direction of the magnetic tape 1 to form the track pattern shown in FIG. 3.

In the digital 8-mm method, data of two tracks in the DV method is continuously recorded in one track Tr0 or Tr1 on the magnetic tape 1 with the same data pattern in the DV method. Therefore, one frame of data conforming to the NTSC system is recorded into five tracks on the magnetic tape 1 in the digital 8-mm method (one frame of data conforming to the PAL system is recorded into six tracks).

Like the DV method, the digital 8-mm method applies 24/25 modulation to superpose pilot signals having three frequencies, f0, f1, and f2, used for tracking control onto data in each track Tr0 or Tr1. In other words, the pilot signals having the different frequencies are recorded in tracks, one for each, in a repeated order of f0, f1, f0, and f2.

With the pilot signals being recorded in this way, when a magnetic head 3 scans a track in which the pilot signal having the frequency f0 has been recorded, it obtains the pilot signals having the frequencies f1 and f2 from adjacent tracks as crosstalk, and stable tracking servo can be thereby applied during reproduction. The same pilot signals as described above are also superposed onto extended data.

Figure 1:
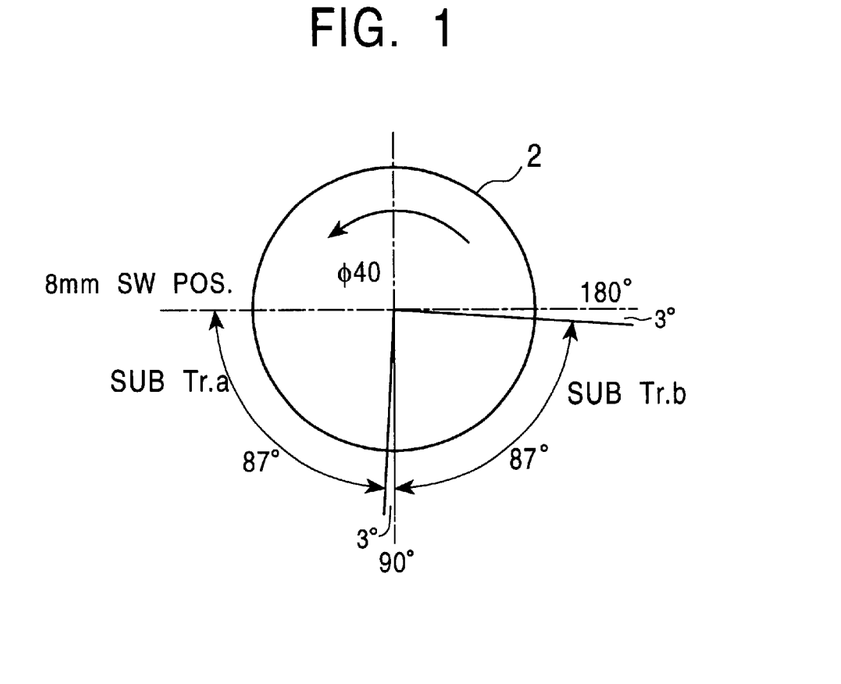
FIG. 1 is a view showing a tape wrap angle of magnetic tape on a rotating drum.

In the digital 8-mm method, the magnetic tape 1 is wound on the rotating drum 2 at an angle of 206 degrees. Therefore, a signal is recorded into one track Tr0 or Tr1 on the magnetic tape 1 when one magnetic head 3 moves within a tape wrap angle of 206 degrees. An effective wrap angle is set to 177 degrees as shown in FIG. 1 and FIG. 2.

Within this effective wrap angle, as shown in FIG. 3, two sub-tracks SubTr0 and SubTr1 are provided. Each of the sub-tracks SubTr0 and SubTr1 is formed at a wrap angle of 87 degrees as shown in FIG. 1, and records one track of data in the DV method by the data format of the DV method. Between the two sub-tracks SubTr0 and SubTr1, an interference area (ITG: Inter track gap) (ITG) having an angle of 3 degrees is provided.

In the digital 8-mm method, extended data can be recorded into one track Tr0 or Tr1 on the magnetic tape 1 together with two tracks of data in the DV method, although a figure and a detailed description thereof are omitted. An extended-data area for recording extended data has a wrap angle of 26 degrees. This angle is added to the effective wrap angle of 177 degrees to form a wrap angle of 206 degrees for one track Tr0 or Tr1. Between the extended-data area and the area corresponding to the effective wrap angle of 177 degrees, a guard area having a wrap angle of 1.95 degrees is provided.

In the digital 8 mm method, the two magnetic heads 3 provided for the rotating drum 2 are switched by a switching pulse SWP generated in synchronization with the rotating phase of the rotating drum 2.

In the digital 8-mm method, the track angle of a track Tr0 or Tr1 formed on the magnetic tape 1 is 4.899 degrees. From one end of the magnetic tape 1 near the starting position of a magnetic head in the longitudinal direction, the width to the recording start position of the extended-data area is 1.013 mm, the width to the recording start position of the effective wrap angle is 1.786 mm, and the width to the recording end position of the effective wrap angle is 7.047 mm. The width from the recording start position to the recording end position of the effective wrap angle is 5.261 mm, and the width from one end of the magnetic tape 1 near the starting position of a magnetic head in the longitudinal direction to the center position of the effective wrap angle, namely to the recording start position of the sub-track SubTr1, is 4.461 mm.

A data pattern in the track Tr0 or Tr1 formed on the magnetic tape 1 in the digital 8-mm method will be described below.

A plurality of recording areas are generated in the tracks Tr0 and Tr1. From the starting position of a magnetic head in a track, the extended-data area (not shown), the guard area, the sub-track SubTr0, the interference area ITG, the sub-track SubTr1, and an interference area ITG are provided in that order. In a normal area, in contrast to the extended-data area, formed of the sub-track SubTr0, the sub-track SubTr1, and the interference area ITG disposed therebetween, data of 274,624 bits are recorded in the NTSC system (274,350 bits in the PAL system). The following table 1 shows sectors forming the track Tr0 or Tr1, and the bit structures of blocks forming each sector.

TABLE 1

| Group | Sector | Block | 625/50 (PAL) | 525/60 (NTSC) | |
|---|---|---|---|---|---|
| SubTr0 | ITI | Pre-amble | 1,400 | 1,400 | * |
| | | SSA + TIA | 1,920 | 1,920 | * |
| | | Post-amble | 280 | 280 | * |
| | | Gap | 625 | 625 | * |
| | Audio | Pre-amble | 500 | 500 | * |
| | | Data-sync | 10,500 | 10,500 | * |
| | | Post-amble | 550 | 550 | * |
| | | Gap | 700 | 700 | * |

TABLE 1-continued

| Group | Sector | Block | 625/50 (PAL) | 525/60 (NTSC) | |
|---|---|---|---|---|---|
| | Video | Pre-amble | 500 | 500 | * |
| | | Data-sync | 10,500 | 10,500 | * |
| | | Post-amble | 975 | 975 | * |
| | | Gap | 1,550 | 1,550 | * |
| | Sub code | Run-up | 1,200 | 1,200 | * |
| | | Sub code-sync | 1,200 | 1,200 | * |
| | | Guard | 1,200 | 1,334.85 | * |
| ITG | | Erase margin | 1,250 | 1,250 | * |
| | | Inter track gap | 3,400 | 3,404.65 | * |
| SubTr1 | ITI | Pre-amble | 1,400 | 1,400 | * |
| | | SSA + TIA | 1,920 | 1,920 | * |
| | | Post-amble | 280 | 280 | * |
| | | Gap | 625 | 625 | * |
| | Audio | Pre-amble | 500 | 500 | * |
| | | Data-sync | 10,500 | 10,500 | * |
| | | Post-amble | 550 | 550 | * |
| | | Gap | 700 | 700 | * |
| | Video | Pre-amble | 500 | 500 | * |
| | | Data-sync | 111,750 | 111,750 | * |
| | | Post-amble | 975 | 975 | * |
| | | Gap | 1,550 | 1,550 | * |
| | Sub code | Run-up | 1,200 | 1,200 | * |
| | | Sub code-sync | 1,200 | 1,200 | * |
| | | Guard | 1,200 | 1,334.85 | * |
| ITG | | Erase margin | 1,250 | 1,250 | |
| | | Inter track gap | 3,400 | 3,404.65 | |

Figure 4:
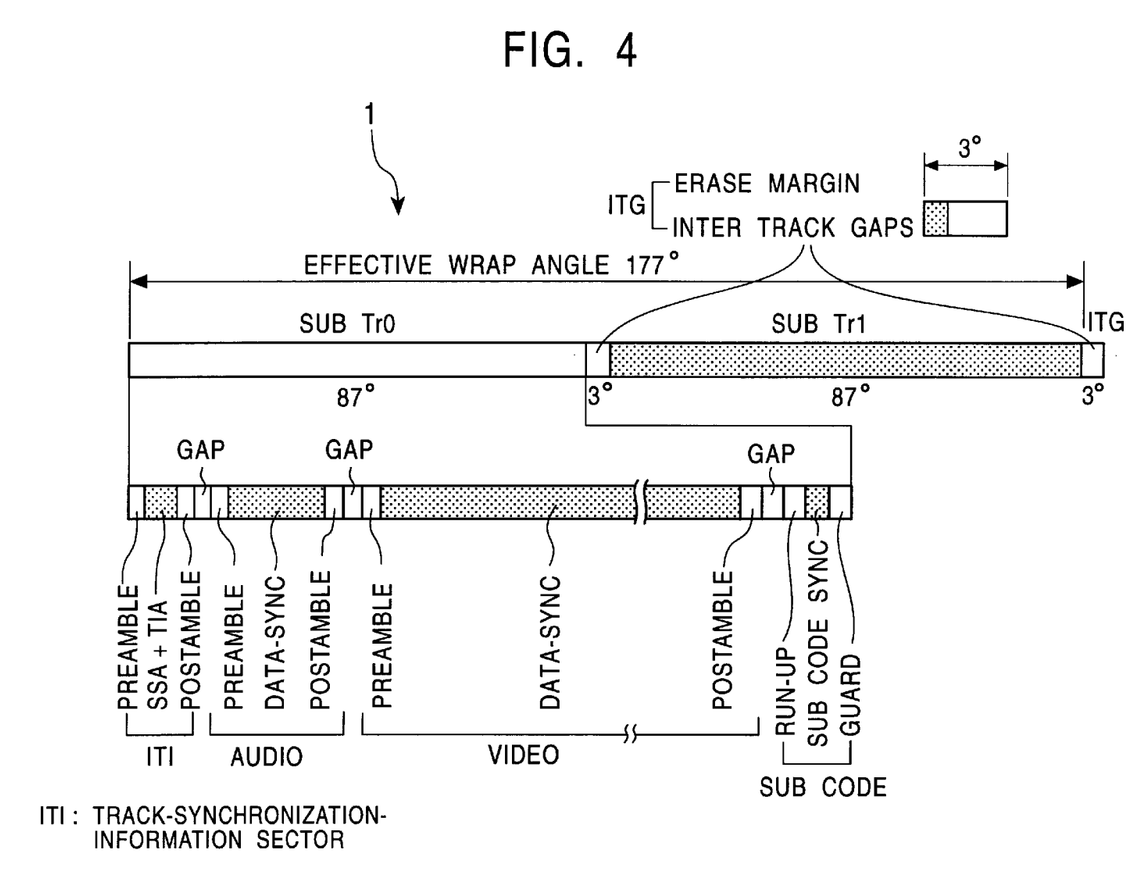
FIG. 4 is a view of a data pattern in a track.

As shown in Table 1 and FIG. 4, in each of the sub-tracks SubTr0 and SubTr1, a track-synchronization-information (ITI: insert and track information) (ITI) sector, an audio (Audio) sector, a video (Video) sector, and a sub-code (Sub-code) sector, all of which form one track of data in the DV method, are recorded in that order from the side of the starting position of a magnetic head.

The ITI (ITI) sector is formed of a pre-amble (Pre-amble) block, a SSA+TIA (SSA+TIA) block, and a post-amble (Post-amble) block. The audio (Audio) sector is formed of a pre-amble (Pre-amble) block, a data-sync (Data-sync) block, and a post-amble (Post-amble) block. The video (Video) sector is formed of a pre-amble (Pre-amble) block, a data-sync (Data-sync) block, and a post-amble (Post-amble) block. The sub-code (Sub-code) sector is formed of a run-up (Run-up) block, a sub-code sync (Sub code-sync) block, and a guard (Guard) block.

Each of the two interference areas (ITGS) is formed of an erase-margin (Erase margin) block and an inter-track gap (Inter track gap) block. Also in the extended-data area (not shown), various extended-data sectors and a track-synchronization-information (ITI) sector for extended data are recorded.

In the present invention, within each of tracks where the pilot signals having the three frequencies, f0, f1, and f2, are superposed, in each ITI (ITI) sector of the sub-tracks SubTr0 and SubTr1 having the above-described data structure, the level of a pilot signal is increased at one of, or both of the pre-amble (Pre-amble) block and the post-amble (Post-amble) block, adjacent to the SSA+TIA (SSA+TIA) block, where the level of the pilot signal is conventionally increased. The level is increased by about 6 dB as in the SSA+TIA (SSA+TIA) block.

With this operation, the pilot signal recorded in one of, or both of the pre-amble (Pre-amble) block and the post-amble (Post-amble) block, adjacent to the SSA+TIA (SSA+TIA) block, can be used as a reference for tracking servo, in addition to that recorded in the SSA+TIA (SSA+TIA) block, conventionally used as a reference for tracking servo.

Figure 5:
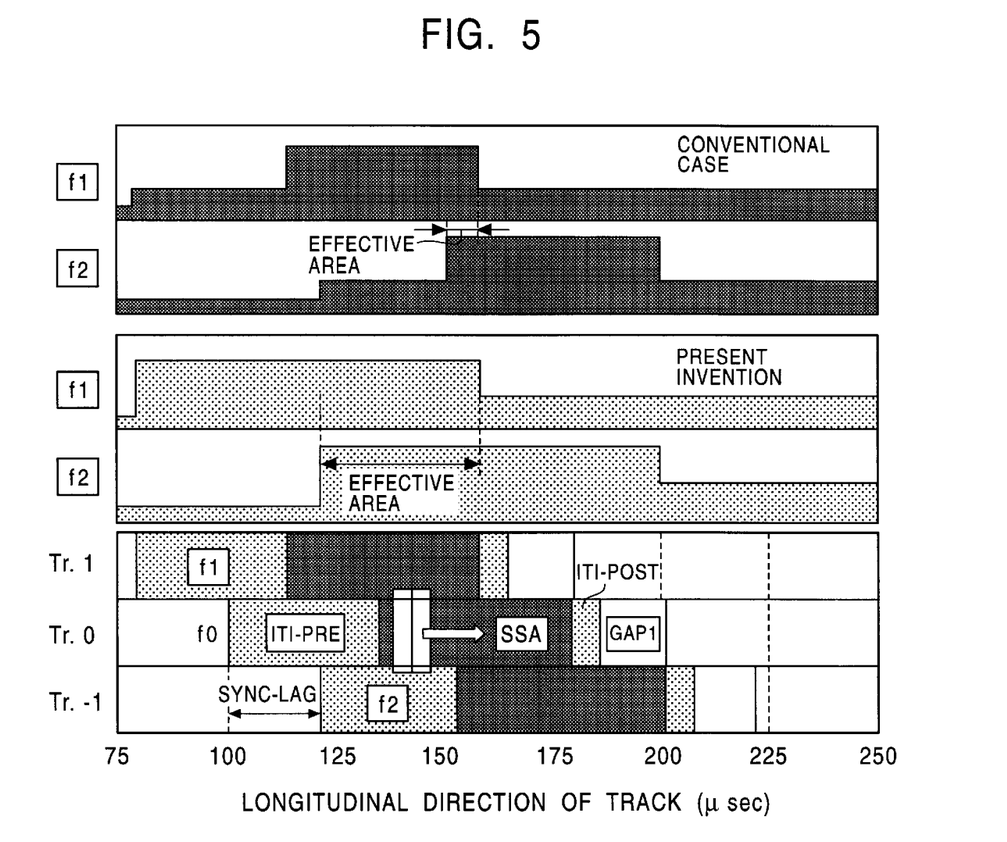
FIG. 5 is a view showing pilot-signal reproduction in an ITI area.

FIG. 5 shows conditions of pilot-signal reproduction in a usual (conventional) digital 8-mm method and in a digital 8-mm method in which the level of a pilot signal is increased in the SSA+TIA (SSA+TIA) block and also in the pre-amble (Pre-amble) block in each sub-track.

In the usual digital 8-mm method, shown at the upper part of FIG. 5, when the magnetic heads 3 reach the ITI sector, the pilot signals having the frequencies f1 and f2 are detected from adjacent, upper and lower tracks. Since the level of a pilot signal is the same in the pre-amble (Pre-amble) block and the post-amble (Post-amble) block as in the other areas of the track, when the magnetic heads 3 reach the SSA+TIA (SSA+TIA) blocks in the adjacent, upper and lower tracks, the enhanced pilot signals having the frequencies f1 and f2 are also detected at the same time. Since the pilot signals having the frequencies f1 and f2 are enhanced only in the SSA+TIA (SSA+TIA) blocks, an area where the pilot signals having the frequencies f1 and f2 are detected at the same time, namely, an effective area shown in the figure is extremely narrow.

On the other hand, in the digital 8-mm method to which the present invention is applied, which is shown at the intermediate part of FIG. 5, the level of the pilot signal is enhanced at the pre-amble (Pre-amble) block as in the SSA+TIA (SSA+TIA) block. Therefore, the pilot signals having the frequencies f1 and f2, which have high S/N ratios, are detected from the pre-amble (Pre-amble) blocks and the SSA+TIA (SSA+TIA) blocks in the adjacent, upper and lower tracks. The pilot signals disposed at the upper and lower tracks can be detected in an extended time, and the effective area is extended to be more than that in the DV method.

Specifically, when only the level of the pilot signal recorded in the pre-amble (Pre-amble) block, which is 33.5 µs long, is enhanced, a period of time when the magnetic heads 3 can read the pilot signals from upper and lower tracks at the same time is greatly extended to 38.8 µs (=(45.9+33.5)−2×20.3), as compared with 5.3 µs in a related method.

In the digital 8-mm method, one track of data in the DV method is recorded (with the same bit structure as in the DV method) into the sub-tracks SubTr0 and SubTr1 so as to maintain compatibility with the DV method in LSIs for circuits. If the bit structure is lost, LSIs used for circuits in the DV method cannot be used in any way and dedicated circuits are required, causing a disadvantage in cost. Therefore, in the digital 8-mm method, the ITI sector (SSA+TIA block) serving as a reference for tracking servo does not function correctly especially during after recording.

In ITI (ITI) sectors according to the present invention, as described above, since the levels of the pilot signals having the frequencies f1 and f2 are increased, in each sub-track, at one of, or both of the pre-amble (Pre-amble) block and the post-amble (Post-amble) block, adjacent to the SSA+TIA (SSA+TIA) block, in the same way as in the SSA+TIA (SSA+TIA) block, it is possible to effectively use the enhanced pilot signals as references for tracking servo, for example, during after recording of video and audio.

In the present invention, as described above, the pilot signals having the frequencies f1 and f2 are enhanced only at predetermined portions and the structure (bit structure) of the sectors and the blocks in tracks is not changed, circuit components for the DV method, such as LSIs, can be used with the minimum change. In addition, since the data pattern in each track is completely compatible with that in the usual digital 8-mm method, if magnetic tape where data is recorded by an apparatus to which the present invention is applied is used in an apparatus of the digital 8-mm method, any adverse effect does not occur.

When the levels of the pilot signals having the frequencies f1 and f2 are increased, in each sub-track, at one of, or both of the pre-amble (Pre-amble) block and the post-amble (Post-amble) block, adjacent to the SSA+TIA (SSA+TIA) block, in the same way as in the SSA+TIA (SSA+TIA) block, data may remain near the starting and ending positions of the magnetic heads 3 in a track during data overwriting, depending on the writing precision of a used apparatus. If the remaining data includes track synchronization information, the precision of the time axis in the track may change or tracking servo may become unstable.

In the digital 8-mm method, however, overwriting is not used, and previous data is deleted with the use of a flying erase head 4 and then new data is written as in the analog 8-mm method, as shown in FIG. 2. Therefore, unlike the DV method, data does not remain. An adverse effect due to remaining data does not occur.

When an ITI sector, an audio sector, and a sub-code sector are provided for the extended-data area, for after recording, the levels of the pilot signals having the frequencies f1 and f2 may be increased, in each sub-track, at one of, or both of the pre-amble (Pre-amble) block and the post-amble (Post-amble) block, adjacent to the SSA+TIA (SSA+TIA) block, in the same way as in the SSA+TIA (SSA+TIA) block, also in the ITI (ITI) sector in the extended-data area. Also in this case, it is possible to effectively use the enhanced pilot signals in the ITI sectors as references for tracking servo, for example, during after recording into the extended-data area in the same way as for the usual area.

The specific shape and construction of each section shown in the above embodiment merely indicate a specific example embodiment of the present invention. The technical scope of the present invention should not be construed thereby in a limited manner.

What is claimed is:

1. A recording and reproduction method for recording digital data on magnetic tape by a helical scanning method or for reproducing digital data recorded on magnetic tape by the helical scanning method, comprising the steps of:
   generating a plurality of sectors in each track on the magnetic tape and recording various types of data, such as video data and audio data, and track-synchronization data;
   recording pilot signals for tracking control on the various types of data in a superposition manner by the use of three different frequencies such that the frequency changes every track in a predetermined repetition manner; and
   recording the pilot signal so as to have a higher level at least in two blocks in a sector where the track-synchronization data is recorded than in the other portion of each track.

2. A magnetic recording and reproduction method according to claim 1, wherein the level of the pilot signal in all blocks in the sector where the track-synchronization data is recorded is made higher than that in the other portion of each track.

3. A magnetic recording and reproduction method according to claim 1, wherein data is recorded in each track by the additional use of a flying erase head.

4. A magnetic recording and reproduction method according to claim 2, wherein data is recorded in each track by the additional use of a flying erase head.

5. A recording and reproduction apparatus for recording digital data by a magnetic head on magnetic tape by a helical scanning method or for reproducing by a magnetic head digital data recorded on magnetic tape by the helical scanning method, comprising:

a circuit for generating a plurality of sectors in each track on the magnetic tape and for recording various types of data, such as video data and audio data, and track-synchronization data;

a circuit for recording pilot signals for tracking control on the various types of data in a superposition manner by the use of three different frequencies such that the frequency changes every track in a predetermined repetition manner; and a circuit for recording the pilot signal so as to have a higher level at least in two blocks in a sector where the track-synchronization data is recorded than in the other portion of each track.

6. A magnetic recording and reproduction apparatus according to claim 5, wherein the level of the pilot signal in all blocks in the sector where the track-synchronization data is recorded is made higher than that in the other portion of each track.

7. A magnetic recording and reproduction apparatus according to claim 5, wherein data is recorded in each track by the additional use of a flying erase head.

8. A magnetic recording and reproduction apparatus according to claim 6, wherein data is recorded in each track by the additional use of a flying erase head.

* * * * *